United States Patent [19]

Cartier et al.

[11] Patent Number: 5,082,515
[45] Date of Patent: Jan. 21, 1992

[54] METHOD OF FORMING A BILAYER GLAZING PANEL

[75] Inventors: George E. Cartier, Springfield, Mass.; Carl P. Piretti, Collinsville, Conn.; Robert H. M. Simon, Longmeadow, Mass.

[73] Assignee: Monsanto Company, St. Louis, Mo.

[21] Appl. No.: 617,734

[22] Filed: Nov. 26, 1990

[51] Int. Cl.⁵ .................................. B32B 31/24
[52] U.S. Cl. ................................. 156/212; 156/103; 156/104; 156/280; 156/286; 156/312; 156/307.3; 264/252
[58] Field of Search ............... 156/109, 285, 286, 381, 156/382, 331.75, 87, 99, 103, 104, 105, 278, 312, 212, 280, 307.3; 264/129, 331.19, 252

[56] References Cited

U.S. PATENT DOCUMENTS

| | | | |
|---|---|---|---|
| 4,683,171 | 7/1987 | Kuga et al. | 427/35 |
| 4,908,083 | 3/1990 | Hall | 156/329 |
| 4,944,822 | 7/1990 | Ishikawa et al. | 156/285 |
| 4,999,147 | 3/1991 | Kojima et al. | 264/139 |

FOREIGN PATENT DOCUMENTS

0369207  5/1990  European Pat. Off. .
1394271  5/1975  United Kingdom .

Primary Examiner—Jay H. Woo
Assistant Examiner—Robert B. Davis
Attorney, Agent, or Firm—Michael J. Murphy; William J. Farrington

[57] ABSTRACT

A method of forming a bilayer glazing panel by providing an optically clear prelaminate of stretched polyester film coated with a cross-linked, self-healing polyurethane layer; assembling the prelaminate with a layer of plasticized partial polyvinyl butyral with the side of the polyester film without the polyurethane layer in facing contact with a subjacent textured surface of the partial polyvinyl butyral layer; clamping the assembled layers in a perimeter anchoring system; sequentially carrying out the following steps i), ii), iii), and optionally the above clamping step within an air autoclave; i) deairing the interface between the polyester film and plasticized partial polyvinyl butyral; ii) forcing localized regions of the layers within the perimeter anchoring system against a sheet of glass; and iii) subjecting the assembly of step ii) to elevated temperature and pressure while the plastic layers remain clamped within the perimeter anchoring system to firmly bond the plastic layers and glass sheet together.

13 Claims, 4 Drawing Sheets

METHOD OF FORMING A BILAYER GLAZING PANEL

BACKGROUND OF THE INVENTION

This invention relates to bilayer glazing panels and more particularly to a method of forming such panels.

Laminated glazing panels are well known for use as windshields, side and rear windows, and sunroofs in vehicles, architectural glass in buildings including skylights, intrusion security glass, solarium doors and the like. Along with glass, these panels include an energy absorbing plastic layer capable of absorbing a blow from an object without penetration of the glazing panel by the object, thus providing safety to occupants of the surrounding area.

Commercial laminated glazing panels usually have a pane of glass on each side of the energy-absorbing layer. An alternative to this trilayer structure is a bilayer which has a single pane of glass against a plastic inner layer usually of two or more plies. In addition to being lighter in weight, when impact sufficient to break the glass of a bilayer occurs, the danger from glass fragments within a room or vehicle compartment is greatly reduced by the absence of the interior glass layer.

Plasticized polyvinyl butyral is used most as the energy-absorbing layer in the trilayer structures mentioned above. Such polyvinyl butyral contains about 15-30 weight % hydroxyl expressed as polyvinyl alcohol, ("partial PVB") for interaction with the glass to form a tenacious bond in the laminate(along with 0 to 2.5 weight % acetate expressed as polyvinyl acetate with the balance being butyral expressed as polyvinyl butyral). Because of long commercial use in trilayer glazing panels, laminators are quite familiar with the handling and properties of plasticized partial PVB sheet, and it has been proposed for use in bilayers. U.S. Pat. No. 4,937,147 focuses on the bond between partial PVB and polyurethane in a bilayer and U.S. Pat. No. 4,952,457 on the moisture tolerance of plasticized partial PVB sheet in a bilayer. As disclosed in these patents, it is likewise known to use cross-linked polyurethane in bilayers as the damage-resistant inboard surface facing the interior of the vehicle compartment or room containing the bilayer.

While moderately successful, the systems of these patents deal with properties of the plastic components of a bilayer and do not address economical preparation of bilayers on a commercial scale.

SUMMARY OF THE INVENTION

Now, improvements have been made to fulfill a prior art need for commercially attractive systems for preparing bilayer glazing panels Accordingly, a principal object of this invention is to provide a method and apparatus for preparing a bilayer glazing panel.

Another object is to provide a commercially significant, tractable, method and apparatus for preparing such a panel.

A further object is to provide improvements in bilayer glazing panels which use partial PVB and polyurethane as structural components.

Other objects of this invention will in part be obvious and will in part appear from the following description and claims.

These and other objects are accomplished by providing a method of forming a bilayer glazing panel which comprises: a) providing an optically clear prelaminate of stretched polyester film, preferably biaxially stretched polyethylene terephthalate film, coated with a cross-linked, self-healing polyurethane layer; b) assembling the prelaminate with a layer of plasticized partial polyvinyl butyral, preferably having deairing holes outside the area to be used in the glazing panel, with the side of the polyester film without the polyurethane layer in facing contact with a subjacent textured surface of the partial polyvinyl butyral layer; c) clamping the assembled layers of step b) in a perimeter anchoring system; d) sequentially carrying out the following steps i), ii), iii), and optionally step c) above, within an air autoclave; i) deairing the interface between the polyester film and plasticized polyvinyl butyral, preferably by expelling air through the deairing holes; ii) forcing localized regions of the layers of step c) within the perimeter anchoring system against a sheet of glass; and then iii) subjecting the assembly of step ii) to elevated temperature and pressure while the plastic layers remain clamped within the perimeter anchoring system to bond the plastic layers and glass sheet together.

BRIEF DESCRIPTION OF THE DRAWINGS

In describing the overall invention, reference will be made to the accompanying drawings wherein.

DETAILED DESCRIPTION OF THE INVENTION

Figure 1:
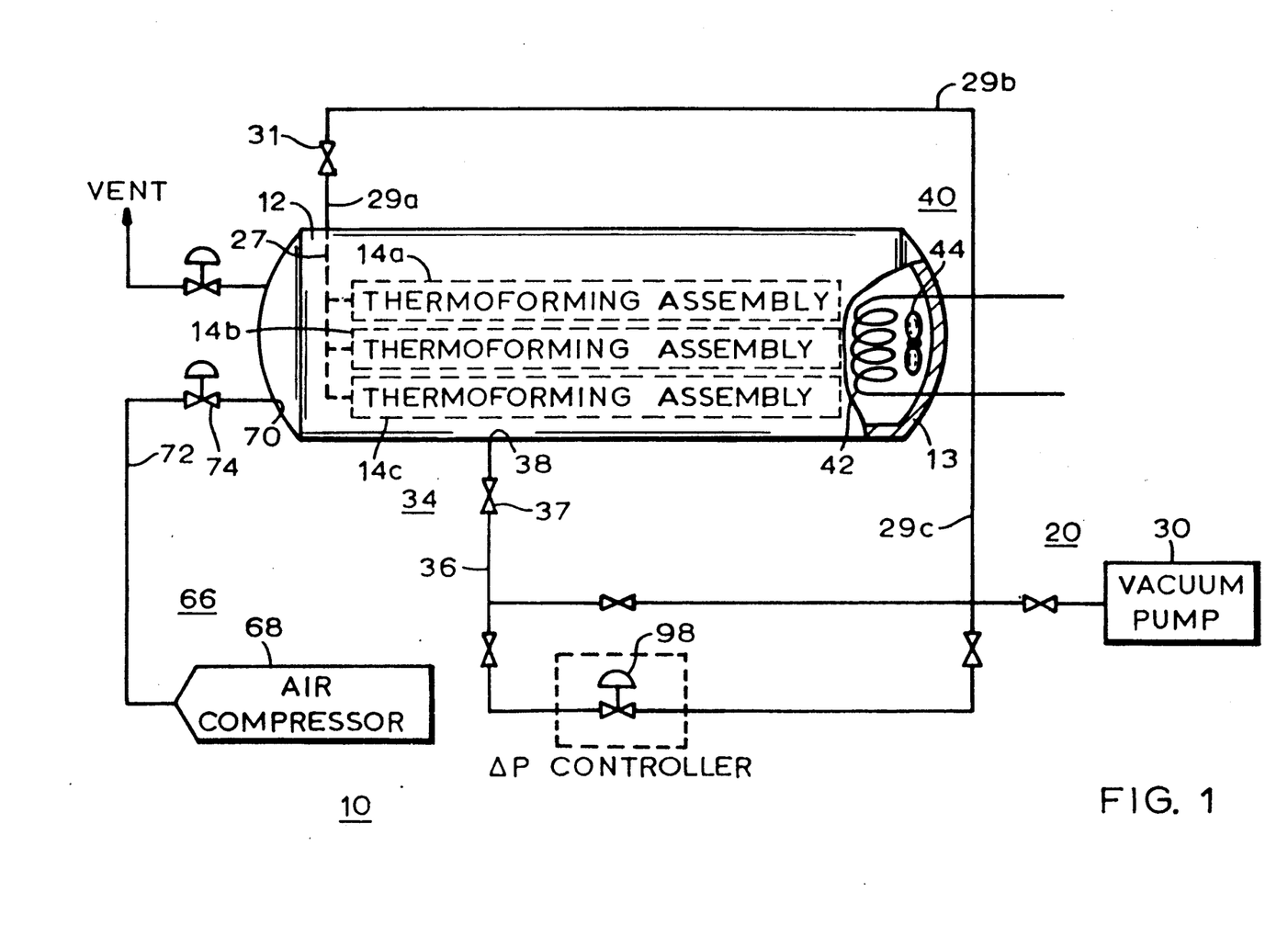
FIG. 1 is a flow diagram of an apparatus assembly according to the invention.
Figure 6:
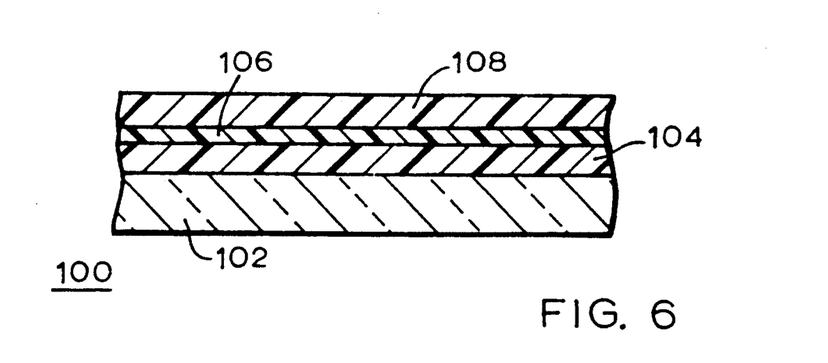
FIG. 6 is a view similar to FIG. 5 of a bilayer glazing panel of the invention.

Referring now to the drawings, apparatus collectively identified as 10 is shown in FIG. 1 for forming bilayer glazing panel 100 (FIG. 6). Apparatus 10 comprises air autoclave chamber 12 defined by walls, illustratively shown as 13, of sufficient strength to withstand significant vacuum and pressure developed during the bonding process to be later described. At least one and preferably plural thermoforming assemblies 14a, 14b, 14c are housed within chamber 12. An appropriate openable and closeable means of access (not shown) to chamber 12 is provided in walls 13 for servicing thermoforming assemblies 14, such as, for example, a sealable hinged access door.

Figure 2:
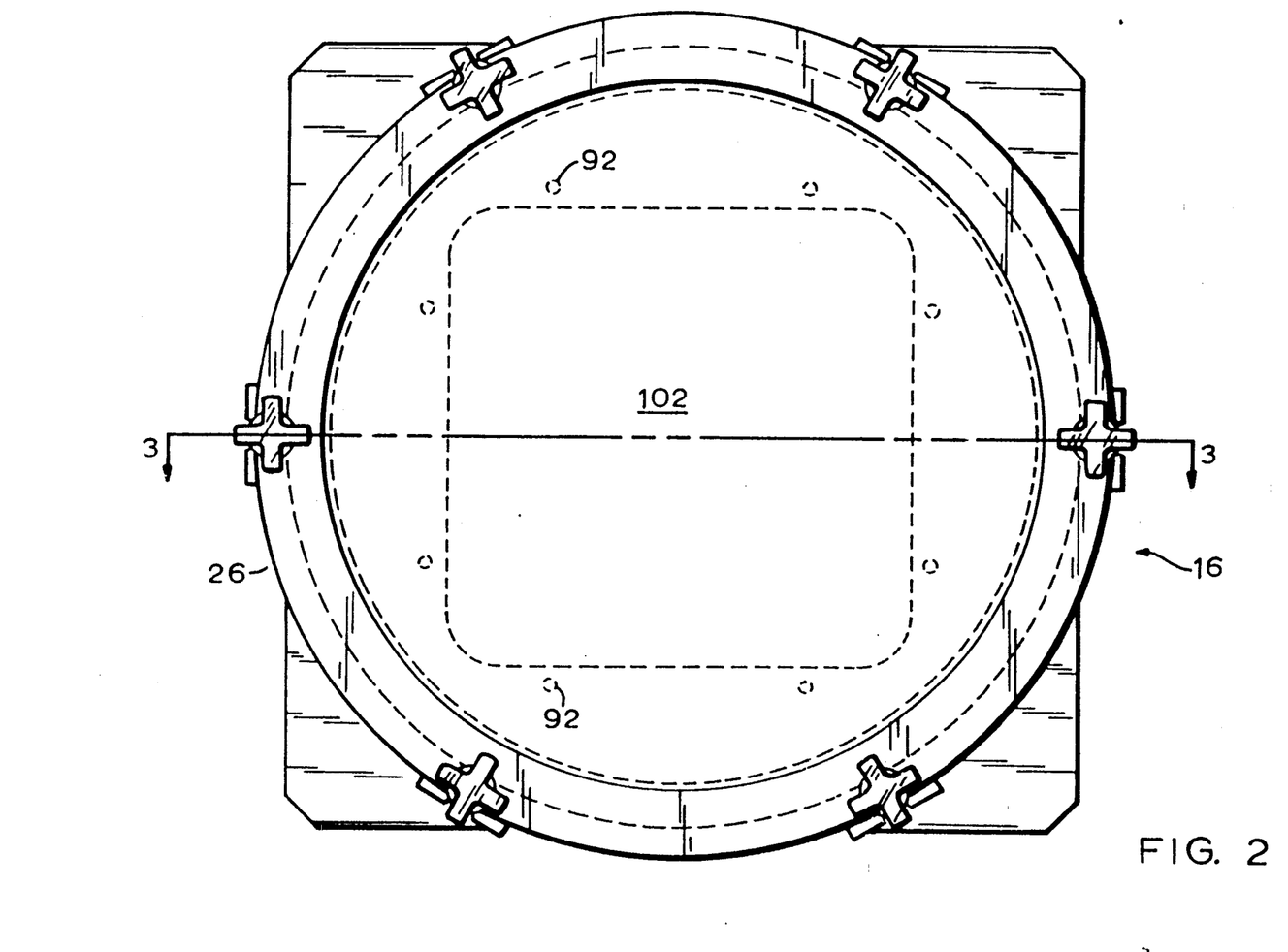
FIG. 2 is a plan view of an apparatus component of FIG. 1.

Each thermoforming assembly 14 (FIGS. 2 and 3) comprises a perimeter anchoring system 16 for a layered composite sheet to be further described, a support bed 18 within the periphery of perimeter anchoring system 16 and means 20 (FIG. 1) associated with support bed 18 for imposing a vacuum on a thermoforming assembly 14. Means 20 comprises opening 22 (FIG. 3) in upstanding sidewall 24 which is rigidly secured to base 28 to form shallow cylindrical housing 26 (FIG. 2). Opening 22 of means 20 in sidewall 24 of housing 26 of each thermoforming assembly 14 communicates via conduits 29a, 29b, 29c (FIG. 1) with vacuum pump 30. When plural thermoforming assemblies 14 are used, each opening 22 is connected to conduits 29 through manifold 27.

As distinguished from means 20, means 34 (FIG. 1) is provided for creating vacuum within autoclave chamber 12 and comprises conduit 36 communicating at one end 38 with the interior of chamber 12 and at another end with vacuum pump 30.

Apparatus 10 further comprises (FIG. 1) means 40 for controllably heating the atmosphere within autoclave chamber 12 which is illustratively shown as electrically conductive heating coil assembly 42 and circulating air fan 44 within chamber 12. Coil 42 is conventionally operatively electrically connected with a power source, not shown.

Support surface 46 of support bed 18 (FIG. 3) has yieldable bearing layer 48 secured thereto formed, for example, of an elastomeric material such as silicone rubber and contoured as shown to match the surface profile of glass layer 102.

Each perimeter anchoring system 16 (FIG. 3) includes sealing ring 49 and plural threaded knobs 50a, 50b evenly spaced around the perimeter of housing 26 which are swingably moveable in arrowed direction 52 into and out of engagement with ring 49 via pivotal attachment at 54 to a bracket secured to sidewall 24 of housing 26.

Figure 3:
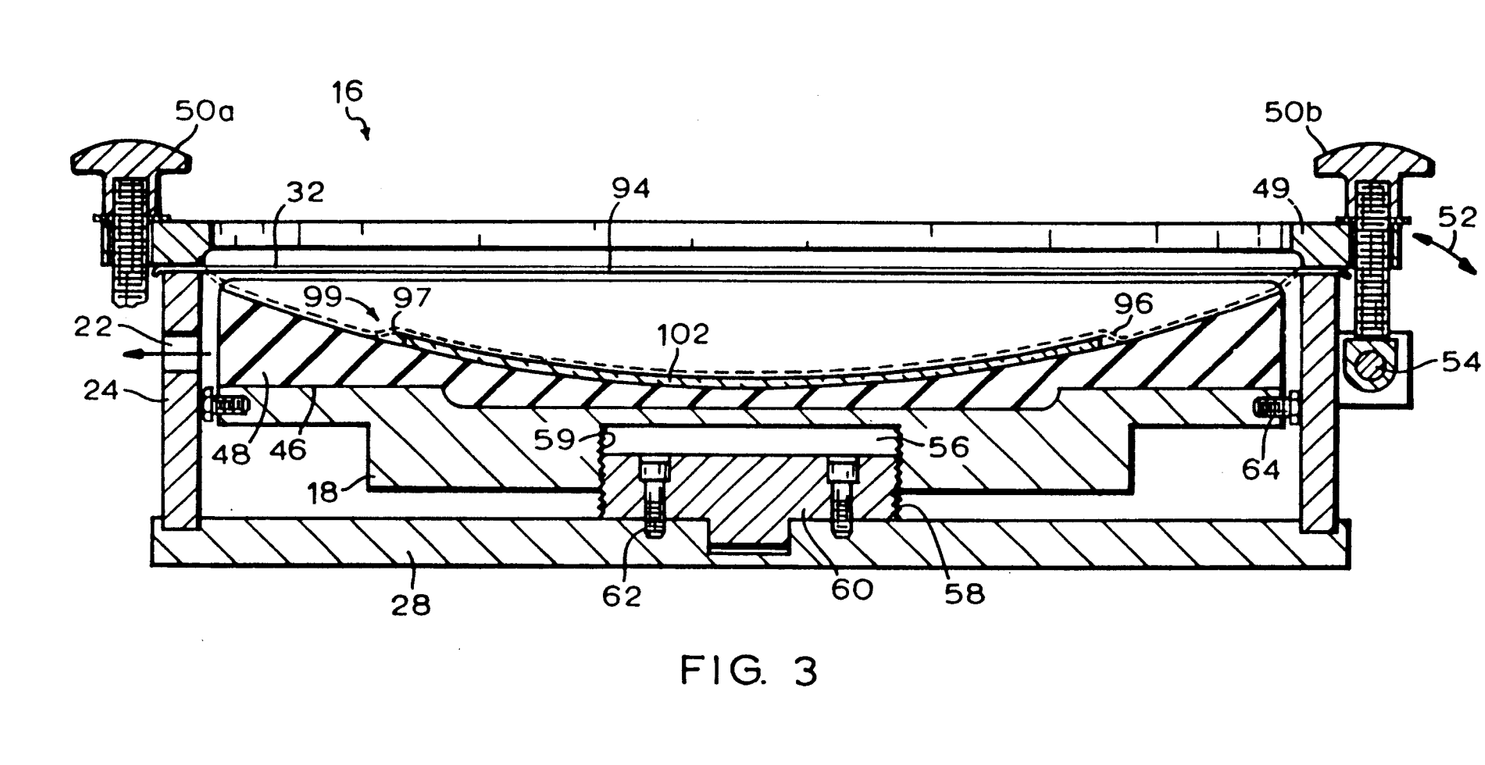
FIG. 3 is a sectional view along 3—3 of FIG. 2.

Tapped bore 56 on the vertical axis of support bed 18 within housing 26 cooperatively engages threads 58 of member 60 fastened by bolts 62 to base 28. The vertical position of support bed 18 within housing 26 is set by rotating bed 18 to cause cooperative up or down movement of threads along threads 58. Plural peripherally spaced, horizontally adjustable positioning bolts 64 center support bed 18 concentrically within cylindrical housing 26 via engagement with the inner surface of sidewall 24. For non-circular (e.g. rectangular) configurations of support bed, enclosing housing and cooperating perimeter anchoring system, the support bed is vertically positioned by an alternative means such as shim stock between the bed and the base of the housing.

Means 66 (FIG. 1) comprising air compressor 68 communicating at 70 with autoclave chamber 12 through line 72 containing control valve 74 creates positive pressure within chamber 12 at the appropriate stage of the forming process.

Each thermoforming assembly 14 is removably seated on an appropriate support shelf not shown, or, alternatively, stacked one upon the other in one or more stacks within chamber 12.

Figure 4:
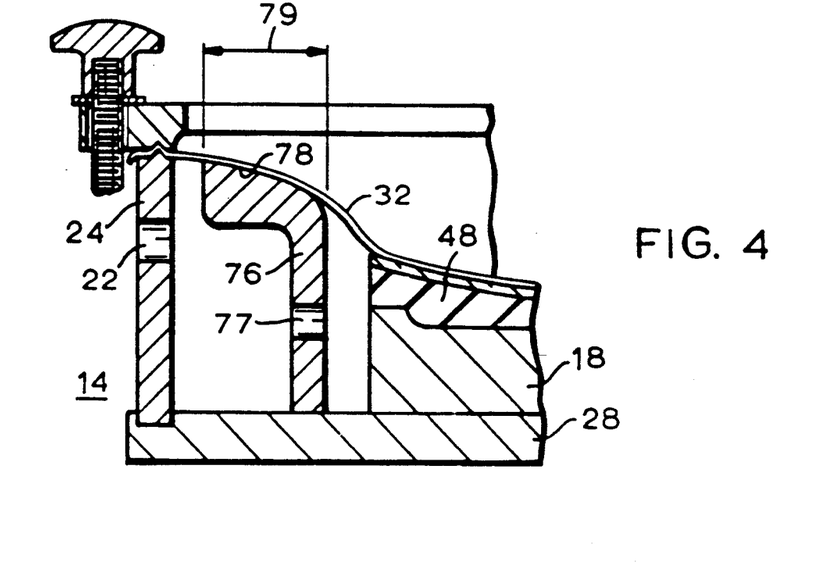
FIG. 4 is a partial, sectional view of an alternate embodiment of FIG. 3.

In the FIG. 4 embodiment, where like numerals identify components having the same numbers in FIGS. 2, 3, thermoforming assembly 14 optionally includes spacer 76 between sidewall 24 and support bed 18 having weep hole 77 to provide communication between vacuum opening 22 and support bed 18. Contoured surface 78 of spacer 76 supporting region 79 of layered composite 32 avoids any large unsupported areas during shaping which if present might rupture the composite. Spacer 76 of appropriate shape and peripheral extent could be used, for example, when a single common housing 26 is used to accommodate different peripheral bilayer shapes and, accordingly, different contours of support bed 18. Thus, when a particular bilayer configuration is being formed with such a common housing, spacer 76 could be used to avoid such substantial unsupported area as just described, whereas for a peripherally larger configuration as shown in FIG. 3, it could be removed as unnecessary.

The method will now be described for forming bilayer glazing panel 100 (FIG. 6) of glass and plastic using apparatus 10.

The optically clear prelaminate presented to apparatus 10 for fabrication with glass into a bilayer glazing panel comprises a stretched polyester, such as polyethylene terephthalate (PET), film coated with crosslinked, self healing polyurethane (PU) and optionally treated or coated on the reverse side to promote adhesion particularly to plasticized partial PVB. Prelaminate formation is described later herein.

Figure 5:
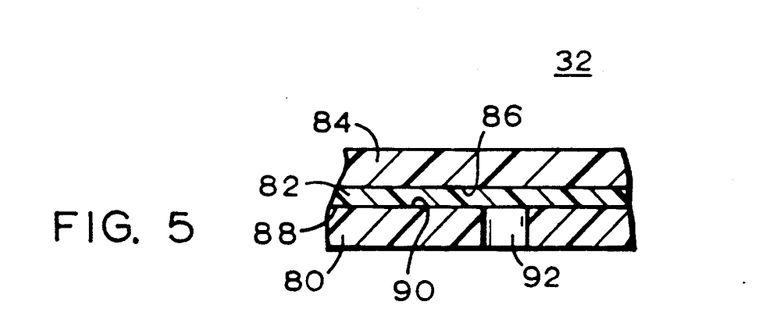
FIG. 5 is a sectional view in enlarged detail of a portion of the plastic layers during a forming step of the invention.

The prelaminate is assembled with a layer of plasticized partial PVB with the side of the PET without the PU facing a subjacent surface of the plasticized partial PVB layer. This assembly is collectively schematically shown as layered composite 32 in FIG. 3 and in detail in FIG. 5 where 80 is the plasticized partial PVB layer, 82 is the PET layer and 84 the PU layer. Surface 86 of PET layer 82 bears PU layer 84 and surface 88 of layer 82 is in face-to-face contact with preferably textured, subjacent side 90 of plasticized partial PVB layer 80. Plural spaced deairing holes 92 (FIG. 5) extend completely through the thickness of plasticized PVB layer 80 outside (FIG. 2) the area of layer 80 to be used in the bilayer glazing panel. The open size of holes 92 is not critical and can be determined by simple experiment. Openings of about 3 to 10 mm have been used successfully and may be formed manually in the soft PVB material or, for example, by passing layer 80 over a powered cylinder provided with sharp projections to pierce the sheet, or by some alternate equivalent means.

Deairing holes 92 communicate with the interface between layers 80 and 82. Instead of such holes, an alternative means associated with the apparatus could be provided for deairing this interface such as, for example, a separate deairing ring, not shown, opposite the interface between clamping ring 49 and the top of sidewall 24 having ports through which a vacuum could be drawn on such interface.

Assembly 32 of plastic layers is clamped within perimeter anchoring system 16 in the substantially horizontal attitude shown in FIG. 3. Clamping between sealing ring 49 and the top face of sidewall 24 is achieved by pivoting each knob 50 into the FIG. 3 position and then turning it downwardly to compressively engage the illustrated washer with the sealing ring surface as shown.

After sealing autoclave chamber 12 shut, the following steps are then carried out sequentially, preferably in an automated manner. The valves between vacuum pump 30 and opening 38 of means 20 (FIG. 1) are opened and pump 30 energized to impose a vacuum within autoclave chamber 12. Valve 31 of the means for imposing vacuum on a thermoforming assembly 14 is opened to also selectively create essentially the same vacuum through opening 22 on the underside of the layered composite 32 clamped within anchoring system 16. Though composite 32 may be optionally heated to facilitate drawing, it is preferably unheated at this stage of the process. The vacuum on the underside of composite 32 sealed within assembly 16 causes air to be expelled through holes 92 in lowermost plasticized PVB layer 80 thereby deairing the interface between PET layer 82 and plasticized PVB layer 80 while, as in FIG. 3, composite 32 remains essentially horizontal because of the equal vacuum above composite 32 imposed through port 38. Vacuum pump 30 is then deenergized and compressor 68 engaged to gradually (via control valve 74) develop a pressure differential across the desired assembly of plastic layers to force localized regions (94 in FIG. 3) within the periphery of the perimeter anchoring system and inward of deairing holes 92 in PVB layer 80 against the surface of an underlying transparent sheet 102 of float glass previously positioned on the break-resistant surface of yieldable layer 48. The drawn position of layered composite 32 after region 94 engages glass layer 102 is approximately shown as within dotted lines 96 in FIG. 3. While the plastic layers are essentially in dotted line position 96 and continue clamped within perimeter anchoring system 16, the temperature and pressure within chamber 12 are increased to levels which are maintained for a period of time adequate to firmly bond plasticized partial PVB layer 80 to glass layer 102 through interaction with the polyvinyl alcohol groups of the partial PVB layer, as well as to melt bond polyethylene terephthalate layer 82 to partial PVB layer 80. Air at elevated temperature is provided by energizing coil 42 (FIG. 1) and circulated within chamber 12 via fan 44. Using compressor 68 and control valve 74, pressure within chamber 12 is gradually controllably increased to the desired level. As such pressure is increasing, differential pressure control value 98 functions to maintain the pressure on the underside of drawn composite 96 being imposed on an assembly 14 through port 22, incrementally below the increasing autoclave pressure being developed on the top side of the drawn composite. This is accomplished by providing for control value 98 to controllably open to gradually increase pressure within a thermoforming assembly 14 through lines 29, (FIG. 1), valve 37 being open. This feature helps to avoid any tendency of the drawn, clamped composite to rupture in the region where it overhangs bearing layer 48 inward of sealing ring 49 or of the glass to fracture.

Autoclave conditions for creating the desired bond between the partial PVB and glass layers are about 140° C. and 1135 kPa for about 30 minutes.

After reducing conditions within chamber 12 to atmospheric, removing the laminate from assembly 14 and trimming away unwanted plastic portions outside the periphery of glass layer 102, the product of the process is wrinkle-free bilayer glazing panel 100 (FIG. 6) comprising sequentially, glass sheet 102, shaped layer 104 of plasticized, partial PVB firmly bonded to glass layer 102, transparent polyester film 106 and layer 108 of cross-linked, self-healing polyurethane. As illustrated in FIG. 3, glass sheet 102 (and therefore bilayer glazing panel 100) preferably has compound curvature by which is meant that some degree of stretching of the flat, planar thermoplastic layers of composite 32 is necessary in conforming such thermoplastic layers into surface contact with the compound curvature surface. Alternatively a flat sheet of glass may be used to produce a substantially planar bilayer glazing panel which may be quite adequate, for example, as a side window in a motor vehicle.

Preparation of an optically clear prelaminate of polyester and polyurethane for processing in apparatus 10 will now be described. The polyester is stretched film, preferably optically clear biaxially stretched polyethylene terephthalate film about 0.0125 to 0.175 mm thick optionally coated, such as with a pressure sensitive adhesive, or treated such as by plasma, flame, corona, glow discharge or the like, on one or both sides, to promote adhesion and specifically to promote adhesion to plasticized partial PVB. Such polyethylene terephthalate contains repeating units of ethylene terephthalate and includes copolymers of ethylene terephthalate where up to about 10 mole percent of the esterifying glycol units are derived from diethylene glycol; propane—1,3 diol; butane—1,4 diol; polytetramethylene glycol; polyethylene glycol and the like and up to about 10 mole percent of the acid component is derived from acids such as isophthalic; dibenzoic; naphthalene 1,4—or 2,6—dicarboxylic; adipic; sebacic and the like.

The polyester film is coated with transparent, cross-linkable polyurethane which is usually, but not necessarily, a single layer. The chemical structure of the polyurethane can vary widely provided that after curing a cross-linked, self-healing surface is obtained which is capable of damage-resistant, non-yellowing performance as the inner exposed surface of a bilayer glazing panel—i.e. facing the occupant of a vehicle or room containing the bilayer panel as a window. Preferred polyurethane compositions and performance-enhancing additives, tailored as hereinafter described as may be necessary for use with polyester substrates, are disclosed in U.S. Pat. No. 4,937,147, col. 4, line 45 through col. 7, line 20, U.S. Pat. No. 4,923,757, col. 3, line 45 through col. 5, line 37 and U.S. Pat. No. 4,925,734, col. 4, line 31 and col. 5, line 30, the noted content of which is incorporated herein by reference.

Plasticized partial PVB sheet at a thickness of about 0.25 to 1.5, preferably about 0.35 to 0.75 mm, is commercially available from Monsanto Company as SAFLEX® sheet and E.I. duPont de Nemours & Company as BUTACITE® polyvinyl butyral resin sheeting. As commercially supplied, such sheet contains plasticizer and is textured or roughened on each of its major side surfaces Plasticizers for partial polyvinyl butyral are well known and disclosed in U.S. Pat. No. 4,902,464, col. 5, lines 11—21, the content of which is incorporated herein by reference; techniques for texturing the surface of plasticized partial PVB sheet are likewise known and disclosed in U.S. Pat. Nos. 2,904,844; 2,909,810; 3,994,654; 4,575,540 and European Patent No. 0185,863, the content of which is likewise incorporated herein by reference.

The PU composition is applied to the polyester film by rolling, spraying, casting, spinning, extrusion, rod or blade coating, slide or cascade coating or the like. For ease of large scale application, curtain coating is preferred.

Commercially available, self-contained curtain coating systems are usable. In a typical system the ingredients are mixed in a stirred vessel and pumped through a filter to a coating head disposed above a receiving trough extending perpendicular to the forward direction of movement of feed and take-away conveyors supporting the substrate being coated. The trough is fed by gravity from the coating head and a liquid curtain of the PU formulation issues through an adjustable gap opening at its bottom through which the substrate is conveyed to deposit a layer of uniform thickness on the substrate surface. Depending on the viscosity and thickness of the formulation and the physical characteristics of the substrate, certain measures may be required to prepare the substrate film to promote deposition of a level smooth coating thereon.

After deposition of the PU formulation, the coated polyester film is exposed either to elevated temperature, electron beam or ultraviolet (UV) light or a combination of the foregoing for a time sufficient to activate cross-linking agent(s) in the formulation to cure and cross-link the coating. An oven for thermal curing and/or one or more banks of UV lights may be operatively positioned downstream of and in line with the takeaway conveyor of a curtain coater to facilitate continuous curing.

The invention is further described in the following examples which are for illustration only and not to limit or restrict the invention. Amounts expressed as equivalents are obtained by dividing measured molecular weight by the number of measured functional groups per molecule.

The following tests were used to obtain the results tabulated in the Examples

Exposure Stability—Bilayer laminates exposed to a Xeron Weatherometer for the specified time were checked for yellowness which was characterized as yellowness index (YI) and haze (see below). YI was measured using a Hunter D25 Spectrometer. YI less than 16 is deemed acceptable.

% Haze—ASTM D1003—61 (Reapproved 1977)—Procedure A—using a Hazemeter, Hunterlab Model D25 from Hunter Associates Inc., Reston, VA. Less than 4% haze is deemed acceptable as optically clear.

Abrasion Resistance measured as the change in % haze after 100 abrasion cycles: 4 in×4 in (10 cm×10 cm) samples of glass/plasticized PVB/PET/PU bilayer laminates were prepared and the layer abraded using a Teledyne Taber Abrader 5130, abrasive wheels No. CS-10F under 500 g weight. The laminates were exposed in Florida at a 45 degree angle facing south. Less than 4% change in % haze is deemed acceptable.

Deformation Recovery—the PU surface of a layer laminate sample of glass/plasticized PVB/PET/PU is deformed at room temperature with a 20 mil (0.51 mm) thick blade at a 500 g load for 5 sec. The time required for the deformation to recover is measured. A recovery time of less than 24 hours is considered acceptable.

Solvent Resistance—drops of various solvents such as methanol, methylene chloride, chloroform, toluene, etc. are successively held on the PU surface for 5 sec. and wiped off. The effect on the surface and time to recover from swelling are noted. Recovery occurring within 12 hr is deemed acceptable.

EXAMPLE C-1

This control Example shows the quality after aging of the exposed surface of a PU coating on a plasticized PVB substrate according to U.S. Pat. No. 4,937,147.

The substrate was a sheet of partial PVB resin from Monsanto Company as Saflex ® TG sheet 0.75 mm thick having a hydroxyl content of 18.2% plasticized with 35 parts dihexyl adipate per 100 parts resin. The PU used is disclosed in Example 6 of the '147 patent and it was prepared, applied to and thermally cured at 50° C. on the plasticized PVB sheet as disclosed in this Example. A bilayer laminate with glass of this PVB/PU structure was prepared and exposed to 50° C. for an extended period to assess the effect of the PVB plasticizer on the PU coating. After about thirty days the exposed PU surface felt lubricious to the touch meaning a decrease in the coefficient of friction due to absorption of the dihexyl adipate by the polyurethane followed by migration to the exposed surface.

EXAMPLE 1

This is according to the invention.

Optical grade, transparent biaxially stretched polyethylene terephthalate (PET) film 0.1 mm thick was obtained commercially from Hoechst Celanese as HOSTAPHAN 4400. Without further surface modification, a curtain coater as above described was used to coat this PET film with PU. The support for the PET film during coating was prepared as follows. A layer of glass on a wood board about 45 cm wide provided a smooth surface and a porous cloth was stretched over the glass and fastened to the board. A section of the PET film placed on the cloth was then fastened to the board. This assembly was placed in a hot air oven and the temperature increased to 150° C. at which point the heating means was immediately shut off. This heat pretreatment relaxed stresses in the PET to draw the film taut under light tension and cause it to lie flat on the support. The underlying porous cloth facilitated escape of air from beneath the PET film during heat treatment. These preparation procedures may not be necessary with a continuous, full scale process using a continuous web of film held taut in horizontal position by an appropriate means such as a moving vacuum plate or tenter frame. The PET film supported as described was then placed on a 45 cm wide conveyor moving at about 19 m/min under the reservoir of a curtain coater having a gap discharge opening adequate to form a coating thickness of about 0.25 to 0.5 mm through which issued the following PU formulation.

| Component | Charge Equivalents | Gms. |
|---|---|---|
| Methylene bis (4-cyclohexylisocyanate) (DESMODUR W From Mobay Corp.) | 0.13 | |
| [1]Polyether triol | 0.0425 | |
| [2]Polyether capped triol | 0.0075 | |
| [3]Ethoxylated Timethylol Propane (cross-linker) (ETMP) | 0.07 | |
| Dibutyl tin diacetate (catalyst) | 200 ppm | |
| Additives: | | |
| [4]TINUVIN 765 (0.25 wt. %) | | 0.5 |
| [5]TINUVIN 328 (0.25 wt. %) | | 0.5 |
| [6]IRGANOX 245 (0.25 wt. %) | | 0.5 |
| Dow Corning 57 (leveling agent) | 300 ppm | |

[1]NIAX LG-168, mol. wt. = 1000, from Union Carbide Corp., Danbury, CT, synthesized by condensing glycerine and propylene oxide.
[2]NIAX 11-27, mol. wt. = 6200 from Union Carbide Corp. Synthesized by capping the glycerine-propylene oxide adduct with ethylene oxide.
[3]VORANOL 234-630, Dow Chemical Co.
[4]TINUVIN 765: bis(1,2,2,6,6-pentamethyl-4-piperidinyl) sebacate from Ciba Geigy Corp.
[5]TINUVIN 328: 2-(2' hydroxy-3',5'-di-tert-amylphenyl) benzotriazole from Ciba Geigy Corp.
[6]IRGANOX 245: triethylene glycol bis [3-(3'-tert-butyl-4'hydroxy-5'methylphenyl) propionate from Ciba Geigy Corp.

The curtain coated PET film was cured at 70° C. for one hour, which is below the temperature range within which stresses in the PET film are substantially relieved, to cross-link the PU and provide a tack-free PU surface. After removal from the support, the coated film constituted the prelaminate to be used in a bilayer glazing formed using the previously described system as will now be specifically described, again with reference to the drawings.

The thermoforming assembly was circular in peripheral shape and housing 26 had an inside diameter of 36.8 cm. Support bed 18 was 35.6 cm diameter and yieldable facing 48 was a molded, room temperature vulcanized, silicone elastomer with a Shore A Durometer hardness of about 65. The upper concave surface of facing 48 was spherical with a radius of curvature of 48.3 cm. The vertical position of bed 18 within housing 26 was adjusted so the upper rim of facing 48 was about 0.32 cm below the top of sidewall 24 of housing 26. Support bed 18 was fixed concentrically within housing 26 by tightening positioning screws 64 against the inside surface of sidewall 24 of housing 26.

Substrate 102 was a 0.23 cm thick rectangular (about 22.2 cm by 27.9 cm) plate of transparent float glass with rounded corners which had been oven bent to a spherical curvature of about 48.3 cm radius to closely match that of the support member 48. Plate 102 was centrally positioned on member 48, concave side up.

Layered composite 32 comprised a lower layer of plasticized partial PVB of the type and thickness used in Example C-1 having both surfaces textured, in facing contact with the specific prelaminate just described—i.e. 0.05 mm thick PET film coated on its top side with a crosslinked PU layer about 0.25 mm thick. The plasticized partial PVB layer had eight 6 mm diameter through holes equispaced on a 34 cm diameter circle. The layered composite was clamped between clamping ring 49 and the top face of sidewall 24 forming an air-tight seal around the clamped periphery.

The clamped thermoforming assembly was then placed inside autoclave chamber 12 and the vacuum connection made to manifold 27 (FIG. 1). The autoclave was sealed and the thermoforming assembly and autoclave chamber simultaneously evacuated while at or near room temperature via vacuum pump 30 to a pressure of 1.33 kPa or less. When evacuation was complete, the vacuum connection to the autoclave chamber was closed (valve 37 in FIG. 1) and air slowly admitted to chamber 12 until the pressure in chamber 12 reached about 97 kPa. The pressure differential developed across composite sheet 32 sharply stretched it into conforming contact with the curved surface of glass pane 102. Since the space between the clamped composite 32 and the glass substrate and the interface between sheet 80 and film 82 had been evacuated, there was negligible air entrapment during this shaping step. The autoclave pressure was then increased to 1136 kPa over about 10 minutes while differential pressure controller 98 was set to maintain the pressure in the thermoforming assembly 35-135 kPa below autoclave pressure to protect against breakage of glass layer 102 or rupture of the composite sheet in the region between the edge of layer 102 and the clamping ring. When the autoclave pressure reached 1136 kPa the pressure difference was reduced to zero.

Simultaneously with the start of the rise of autoclave pressure, temperature within the autoclave was raised at a rate of 5° C./min., leveling off at 145° C. and there held for 30 minutes. The autoclave was then cooled to room temperature at 5 to 10° C./min., vented over about 5 min to atmospheric pressure and opened. The thermoforming assembly was removed, the clamps loosened and the glass/composite sheet extracted.

Excess plastic was trimmed away leaving a bilayer glazing panel which included plastic layers perfectly conformed to the glass layer without visually apparent wrinkles or optical distortion of objects on one side of the panel as viewed from the opposite side.

A section of the bilayer panel just described exposed to the same 50° C. elevated temperature used in Example C-1 had a perfectly dry exposed polyurethane surface after about 30 days indicating that no migration of the plasticizer of the partial PVB layer had occurred.

Results of property tests on wrinkle-free bilayer glazing panels of this Example were as follows:

| Property | Result | | |
|---|---|---|---|
| | Hrs. | | |
| Exposure Stability | 0 | 4500 | 5000 |
| YI | 0.8 | −1.52 | −1.95 |
| % Haze | 0.88 | 1.2 | 0.99 |
| Abrasion Resistance | 1.07 @ 0 hrs; 1.67 after 6 mos. Fla. | | |
| Deformation Recovery | 15 min | | |
| Solvent Resistance | After initial swelling, surface returned to normal when solvent evaporated | | |

The above results show the excellent mechanical performance properties of the bilayer glazing panels of the invention. YI increase was less than 5% after 5000 hrs exposure in the Xenon Weatherometer.

EXAMPLE C-2

This control Example shows the effect on bilayer fabrication of the absence of polyester film.

The partial PVB-PU plastic laminate of Example C-1 was laminated with glass into a bilayer using the apparatus and procedure of Example 1; polyester film was not used.

Visual examination of bilayers formed revealed significant ripping at the edge around the periphery of the PU layer (numbered 99 in FIG. 3). When stretched over the edge of the underlying rigid glass layer, the soft PVB tightly conformed to thickness surface 97 of the glass layer. This excess local extension of the partial PVB undesirably ruptured the PU layer which was strongly bonded directly to and consequently exactly followed the stretching movement of the partial PVB. No such edge rupture of the PU layer was noted in Example 1 where the stabilizing influence of the PET film between the partial PVB and PU layers avoided excessive local stretching and associated ripping at the edge of the PU layer.

Moreover, in this Example C-2 the curing temperature of the PU coating has to be limited to about 50° C. to avoid wrinkling and distortion of the PU surface by shrinkage movement of the thermally sensitive underlying partial PVB to which it was chemically bonded. This contrasts with 70° C. in Example 1 in the presence of PET film. Since curing is time-temperature dependent, time can be as low as about 3 min at about 110° C. depending on the specific catalyst and concentraton used. Such higher temperature facilitates commercially desirable reduced curing cycles while still providing a wrinkle-free bilayer product.

EXAMPLE C-3

This illustrates the effect on haze of the PU layer when using certain prior art PU formulations of U.S. Pat. No. 4,937,147 in bilayer glazing panels of the invention.

A PET-PU laminate was prepared according to the prelaminate forming procedure of Example 1, except using the prior art formulation of Example 6 of the '147 patent containing trimethylol propane crosslinking agent. After curing, the PU coasting was so visually milky in appearance that haze was estimated to be unacceptably greater than 4%. In contrast, when the crosslinker of the PU coating on PET film was ethoxylated trimethylol propane, as in Example 1, the haze of the prelaminate and abrasion resistance of the bilayer glazing were well within acceptable quality limits. Similar results are predicted with ethoxylated trimethylol propane triacrylate in a formulation taylored for curing by exposure to UV.

Though the apparatus of the invention has been disclosed herein in use with glass and specific numbers and types of plastic layers, fewer or additional or alternative functional layers and/or coatings of plastic or other materials can optionally be used as desired in the bilayer structures being formed. Similarly, instead of glass, it may be possible to employ an alternative rigid member such as polycarbon or polymethyl methacrylate.

When commercial sized systems of the type described herein are used, the prelaminate can be prepared in roll form and conveniently optionally shipped to another location for local preparation of the bilayer glazing panel.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A method of forming a bilayer glazing panel which comprises:
    a) providing an optically clear prelaminate of stretched polyester film coated with a cross-linked, self-healing polyurethane layer;
    b) assembling the prelaminate with a layer of plasticized partial polyvinyl butyral with the side of the polyester film without the polyurethane layer in facing contact with a subjacent textured surface of the partial polyvinyl butyral layer and the partial polyvinyl butyral layer facing a sheet of glass;
    c) clamping the assembly of plastic layers of step b) in a perimeter anchoring system;
    d) sequentially carrying out the following steps i), ii) and iii) within an air autoclave;
        i) deairing the interface between the polyester film and plasticized partial polyvinyl butyral;
        ii) forcing localized regions of the layers of step c) within the perimeter anchoring system against the sheet of glass; and then
        iii) subjecting the assembly of step ii) to elevated temperature and pressure while the plastic layers remain clamped within the perimeter anchoring system to firmly bond the plastic layers and glass sheet together.

2. The method of claim 1 wherein step c) is carried out within the air autoclave.

3. The method of claim 1 wherein the polyester film is biaxially stretched polyethylene terephthalate.

4. The method of claim 1 wherein step ii) involves drawing the isolated regions against a sheet of glass having compound curvature.

5. The method of any of claims 1, 2, 3, or 4 wherein deairing occurs by expelling air through deairing holes in the plasticized partial polyvinyl butyral layer outside the area to be used in the glazing panel.

6. The method of claim 5 wherein deairing occurs by imposing a negative pressure on both sides of the clamped, horizontally disposed layers.

7. A method of forming a bilayer glazing panel of glass and plastic which comprises;
    a) providing an optically clear prelaminate of biaxially stretched polyethylene terephthalate film coated on one side with a cross-linked, self-healing polyurethane layer and optionally treated or coated on the opposite side to promote adhesion to partial polyvinyl butyral;
    b) assembling the prelaminate with a layer of plasticized partial polyvinyl butyral having deairing holes outside the area to be used in the glazing panel with said opposite side of the polyethylene terephthalate film facing a textured subjacent surface of the partial polyvinyl butyral layer and the polyvinyl butyral layer facing an underlying sheet of glass;
    c) clamping the assembly of plastic layers of step b) in a substantially horizontal attitude within a perimeter anchoring system;
    d) sequentially carrying out each of the following steps i), ii) and iii) within an autoclave;
        i) deairing the interface between the polyethylene terephthalate film and the plasticized polyvinyl butyral layer by expelling air through the deairing holes, without heating either the film or layer;
        ii) imposing a pressure differential across the deaired assembly of plastic layers of step i) to force localized regions within the perimeter anchoring system against the sheet of glass; and then
        iii) increasing the temperature and pressure within the autoclave to levels maintained for a period adequate to tenaciously bond the partial polyvinyl butyral to the glass through interaction with polyvinyl alcohol groups of the partial polyvinyl butyral, and the polyethylene terephthalate to the partial polyvinyl butyral, while the plastic layers remain clamped with the perimeter anchoring system.

8. The method of claim 7 wherein the levels in step iii) are about 140° C. and 1135 kPa.

9. A method of forming a bilayer glazing panel of glass and plastic which comprises:
    a) providing an optically clear prelaminate of biaxially stretched polyethylene terephthalate film coated on one side with a cross-linked, self-healing polyurethane layer and optionally treated or coated on the opposite side to promote adhesion to partial polyvinyl butyral;
    b) assembling the prelaminate with a layer of plasticized partial polyvinyl butyral with said opposite side of the polyethylene terephthalate film facing a subjacent surface of the partial polyvinyl butyral layer;
    c) clamping the assembly of plastic layers of step b) in a substantially horizontal attitude within a perimeter anchoring system spaced above a sheet of glass yieldably supported against breakage with the polyvinyl butyral layer facing the sheet of glass;
    d) sequentially carrying out each of the following steps i), ii) and iii) within an air autoclave;
        i) imposing a negative pressure on both sides of the clamped horizontally disposed layers to deair interfaces between the film and plasticized partial polyvinyl butyral and the space between the glass and adjacent polyvinyl butyral layer;

ii) applying a positive pressure above the deaired assembly of step i) to force localized regions of the plastic layers within the perimeter anchoring system against the sheet of glass; and then iii) increasing the temperature and pressure within the autoclave according to a preset schedule to levels adequate to tenaciously bond the partial polyvinyl butyral to the glass and to the polyethylene terephthalate film.

10. The method of claim 9 wherein the glass has compound curvature.

11. The method of claim 9 including the following steps before step a):

a) applying a single layer of cross-linkable polyurethane to the surface of a transparent, biaxially stretched polyethylene terephthalate film treated or coated on the side without the polyurethane to promote adhesion to partial polyvinyl butyral; and 12. A method of forming a bilayer glazing panel of glass and plastic which comprises:

a) providing a transparent, biaxially stretched polyethylene terephthalate film treated on one side to promote adhesion;

b) coating the untreated side of the film with a single layer of cross-linkable polyurethane;

c) curing the coated film at a temperature below that at which stresses in the polyethylene terphthalate relieve to provide an optically clear prelaminate which includes a cross-linked, self-healing polyurethane layer;

d) assembling the prelaminate with a layer of plasticized partial polyvinyl butyral containing deairing holes with the treated side of the polyethylene terephthalate film in overlying face to face relationship with the subjacent partial polyvinyl butyral layer and the partial polyvinyl butyral layer facing an underlying sheet of glass;

e) sequentially carrying out each of the following steps i), ii), iii) and iv) within an autoclave;

i) clamping the assembly of plastic layers of step d) in a substantially horizontal attitude within a perimeter anchoring system;

ii) deairing the interface between the polyethylene terephthalate film and the plasticized polyvinyl butyral layer without heating either the film or layer by expelling air through the deairing holes;

iii) imposing a pressure differential across the deaired assembly of plastic layers of step ii) to force localized regions within the perimeter anchoring system against the sheet of glass; and then iv) subjecting the assembly of step iii) to elevated temperature and pressure conditions while the plastic layers remain clamped within the perimeter anchoring system to tenaciously bond the plastic layers and glass sheet together.

13. The method of claim 12 wherein the sheet of glass has compound curvature.

* * * * *

UNITED STATES PATENT AND TRADEMARK OFFICE
CERTIFICATE OF CORRECTION

PATENT NO. : 5,082,515
DATED : January 21, 1992
INVENTOR(S) : George E. Cartier, Carl P. Piretti, Robert H. M. Simon It is certified that error appears in the above-identified patent and that said Letters Patent is hereby corrected as shown below:

In col. 7, line 33, "layer" should instead read --bilayer--.

In col. 12, line 33, after "the" insert --underlying--.

In col. 13, line 22, insert as the end of claim 11:

--b) curing the coated film of step a) at a temperature below that at which stresses in the polyethylene terephthalate relieve.--

Signed and Sealed this

Twentieth Day of April, 1993

Attest:

MICHAEL K. KIRK

*Attesting Officer*  *Acting Commissioner of Patents and Trademarks*